April 1, 1952 S. A. CANARIIS 2,591,134
METHOD OF AND AN APPARATUS FOR THE AERATION OF LIQUIDS
Filed March 15, 1948
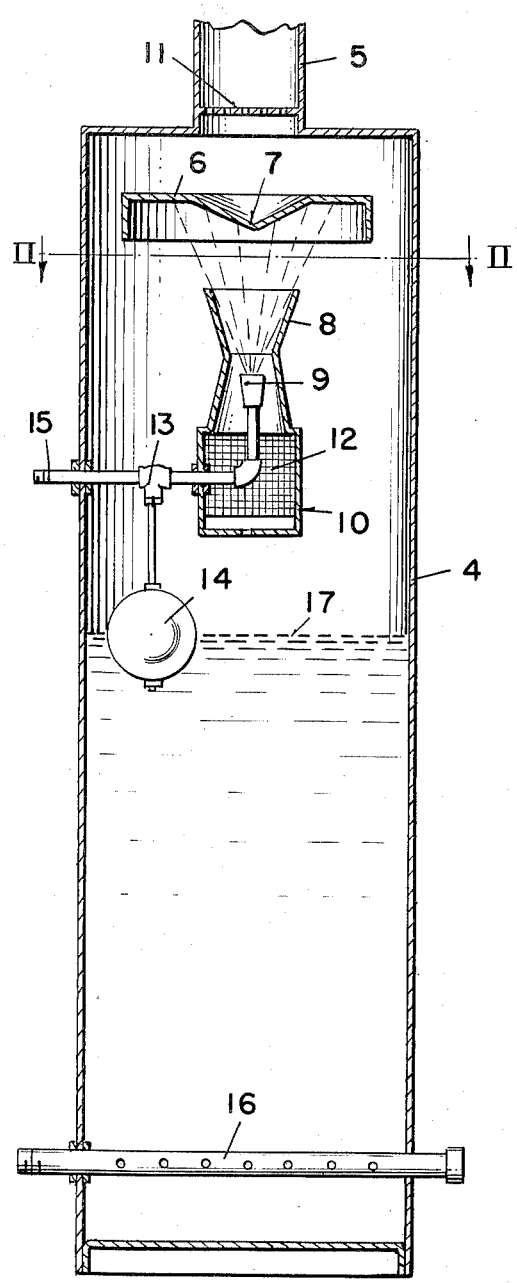
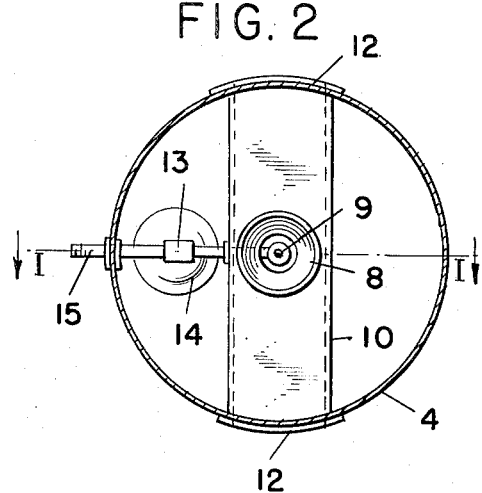
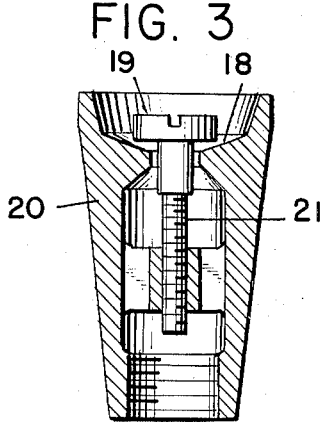
INVENTOR.
SVEND A. CANARIIS
BY
ATTORNEY Patented Apr. 1, 1952

2,591,134

UNITED STATES PATENT OFFICE 2,591,134

METHOD OF AND AN APPARATUS FOR THE AERATION OF LIQUIDS

Svend A. Canariis, Jacksonville, Fla.

Application March 15, 1948, Serial No. 14,926

5 Claims. (Cl. 210—16)

This invention relates to improvements in a method of and an apparatus for the aeration of liquids, for use particularly but not inclusively in water systems wherein it is desired to remove contained oxidizable matter such as taste- and odor-producing gases or minerals from the water for the purpose of purification thereof including the removal of tastes and odors therefrom.

The principle of effecting the removal of contained gases and/or minerals from liquids through the mixing of air with such liquids, thereby to effect oxidation of the contained gases or minerals, is of course well known. However, the prior apparatus designed to carry out this principle is open to certain objections, namely, the requirement for moving parts and power-driven apparatus such as blowers, fans, compressors, etc. for supplying an adequate volume of air for mixing with the liquid, the maintenance of such moving parts, and a long retention period after aeration required to effect the desired oxidation of the contained gases or minerals.

A principal object of the invention is the provision of a method of and an apparatus for the aeration of liquids such as water, which overcomes the stated deficiencies of the prior apparatus having similar function, by introducing air into the liquid at a rapid rate of flow and in such volume and with such an intimate mixing of air and liquid as to effect introduction of oxygen into the liquid and a consequent partial oxidation and release of oxidizable gases contained in the liquid, and that the oxidation of the remaining gases not released upon mixing will take place in a minimum of time.

More specifically, the invention aims to provide an exceedingly simple yet effective liquid aerating apparatus characterized by an arrangement of spray nozzle, ducts and baffles, by which air is introduced into the liquid at a ratio in excess of five to one and wherein this air flow and volume is produced by the flow of liquid in the apparatus and without the use of external sources of power such as blowers, fans, compressors, etc., and without the use of moving parts in the aerator members.

The above and other objects and advantages of the invention will be apparent from the following detailed description thereof, taken with the accompanying drawing illustrating a preferred embodiment of improved apparatus according to the invention, wherein:

Fig. 1 is a vertical section taken through the improved liquid aerating apparatus of the invention;

Fig. 2 is a horizontal section taken on line 2—2 of Fig. 1; and

Fig. 3 is an enlarged section illustrating the details of construction of the spray nozzle employed in the apparatus shown in Fig. 1.

Referring to the drawings in detail, I have illustrated my invention in connection with a liquid aerating apparatus suitable for use in small water systems. As shown, such apparatus employs a closed bottom shell 4 which is vertically arranged, the lower part of the shell serving as a storage receiver for retaining liquid after aeration. Connected to the top of the shell is a vent pipe 5 opening to the outside air, through which released gases are removed by natural draft. A horizontally disposed baffle plate 6 having a depending edge flange and formed with a cone-shaped central part 7 is placed below the vent pipe inlet to prevent the spray from the nozzle from entering the vent, and to assist in the rapid mixing of air and water to release the gases contained in the water.

Disposed below the baffle plate is a vertical duct 8 shaped essentially as an upwardly opening Venturi tube. Coaxially disposed within the duct is a spray nozzle 9 for producing a cone-shaped spray of water, the nozzle being arranged to direct the cone-shaped spray through the upper end of the duct 8, the spray from the nozzle in combination with the Venturi shaping of the duct producing by aspirating action a strong up-draft of air in the duct, and effecting also an intimate mixing of the liquid spray with the upflowing air at the top or lip of the duct. At its lower end, duct 8 is connected to a horizontal duct 10 which, as shown in Fig. 2, may extend diametrically across the shell 4. The ends of the horizontal duct open through the sides of the shell whereby the duct 10 supplies air from the outside to the duct 8. Screens 11 and 12 are provided in the vent pipe and duct inlet openings to prevent entrance of bugs and vermin.

Water is supplied to the nozzle 9 through a water supply pipe 15, flow of the water being controlled by a float valve 13 connected in said line and operated by a float 14. Preferably, the water control valve 13 is of the open and shut type, whereby to supply water to the nozzle at full-line pressure upon lowering of the level of the water in the lower portion of the shell. Water under pressure thus enters the aerator through pipe 15 and, after aeration and retention thereof, the treated water may be withdrawn through a diffuser-type pipe 16 connected into the shell near the closed bottom end thereof, the stored water after aeration being maintained at a maximum level 17 by means of float 14.

Referring to Fig. 9, the spray nozzle 9 is provided with a wide-angled conical seat 18, and its body 20 mounts an adjusting screw 21 having a flat head which is adjustable relative to the seat 18, the arrangement being such that the nozzle will produce a cone-shaped spray of liquid. As seen in Fig. 1, the nozzle spray has diameter at the plane of its emergence from the duct 8 which is substantially that of the upper end edge or lip of the duct.

In the operation of liquid aerating apparatus as described, lowering of the level of the water in the shell 4 beyond that established by float 14 results in water being supplied to the spray nozzle 9 under line pressure, the nozzle producing a cone-shaped spray of liquid. In emerging from the upper end of the duct 8, the spray entrains a substantial volume of air, the air to water ratio at this point being in excess of five to one. This trapping of air at the upper end or lip of the duct 8 creates a strong updraft of air in the duct, with the Venturi shaping thereof decreasing friction losses and thus increasing air flow and hence volume of air entrained by the water. Intimate mixing of water and air takes place when the spray and its entrained air strikes the baffle 6, which results in oxygen being introduced into the water, the bombardment thereof with the water spray resulting in a foaming action, consequent to which a partial oxidation and release of some of the oxidizable gases or chemicals contained in the water takes place. Following their bombardment of the baffle 6, the water spray particles fall and are collected in the lower portion of the shell 4, wherein the remaining portion of the gases is oxidized. Due to the reduced percentage of oxidizable gases retained in the water and the introduction of oxygen into the water as aforesaid, the retention period required for such oxidation is reduced to less than ten per cent of the retention period required by previously known methods of aeration.

Without further analysis, it will be appreciated that the invention achieves the desirable objectives of a simple and effective method of an apparatus for the aeration of liquids which latter is characterized by exceedingly simple construction and design, requires no moving parts or power means and hence little or no maintenance problems. It is a further feature of the invention that the length of time required for retention after aeration for the treatment of a liquid such as water for taste and odor due to hydrogen sulphides, for example, is reduced from the normal period of four hours to a period ranging from five to thirty minutes, such being achieved by the intimate mixing of the air and water and the relatively large ratio of air to water produced by the invention.

While I have illustrated one embodiment of my invention, it is to be understood that various changes may be made therein without departing from the invention and hence that the described construction is illustrative and not limiting.

I claim:

1. Apparatus for the purification of liquids containing oxidizable matter comprising an upright shell having an air vent in its top, a vertically arranged and upwardly opening duct disposed in the upper portion of the shell, said duct being shaped as a Venturi tube and communicating at its lower end with the exterior of the shell, a spray nozzle mounted in the vertical duct coaxially therewith for producing an upwardly directed cone-shaped spray of liquid emerging through the upper end of said duct, said spray entraining a substantial volume of air in moving past said upper end and thereby creating an up-draft of air in said duct, means for supplying the liquid to be purified under substantial pressure to the nozzle, a horizontally disposed baffle a substantial distance above said upper end of the duct and in the path of the cone-shaped spray of liquid and entrained air, said baffle being adapted to effect an intimate mixture and foaming of the liquid and entrained air striking the same resulting in the introduction of oxygen into the liquid and a partial oxidation and release of oxidizable material contained in said liquid, the lower portion of the tank providing a chamber for the liquid falling from said baffle and wherein the liquid collecting therein is allowed to stand for a predetermined retention period resulting in further oxidation of the oxidizable matter contained in the liquid.

2. Apparatus for the purification of liquids containing oxidizable matter as set forth in claim 1, wherein valve means under the control of the level of liquid in the retention chamber is provided in the means supplying liquid to the nozzle.

3. Apparatus for the purification of liquids containing oxidizable matter comprising an upright shell having an air vent in its top, a vertically arranged and upwardly opening duct disposed in the upper portion of the shell, said vertical duct being shaped as a Venturi tube and communicating at its lower end with an air supply duct extending diametrically across said shell and having open ends communicating with the exterior of the shell, a spray nozzle mounted in the vertical duct coaxially therewith for producing an upwardly directed cone-shaped spray of liquid emerging through the upper end of said duct, said spray entraining a substantial volume of air in moving past said upper end and thereby creating an up-draft of air in said duct, means for supplying the liquid to be purified under substantial pressure to the nozzle, a horizontally disposed baffle a substantial distance above said upper end of the duct and in the path of the cone-shaped spray of liquid and entrained air, said baffle being adapted to effect an intimate mixture and foaming of the liquid and entrained air striking the same resulting in the introduction of oxygen into the liquid and a partial oxidation and release of oxidizable matter contained in said liquid, the lower portion of the tank providing a chamber for the liquid falling from said baffle and wherein the liquid collecting therein is allowed to stand for a predetermined retention period resulting in further oxidation of oxidizable matter contained in the liquid, and a liquid withdrawal line connected to the shell adjacent its bottom.

4. The method of purifying a liquid containing oxidizable matter, which comprises the steps of reducing said liquid to an upwardly directed, high velocity spray, utilizing said spray to entrain by aspirating action a substantial volume of air within itself, discharging said spray and entrained air against a horizontally disposed baffle thereby to effect introduction of oxygen into the liquid and a partial oxidation and release of oxidizable matter contained in the liquid, then collecting the liquid particles falling from said baffle, and retaining the so collected liquid for a predetermined retention period required to effect a desired further oxidation of said oxidizable matter contained in the liquid.

5. The method of purifying a liquid containing oxidizable matter, which comprises the steps of reducing said liquid to an upwardly directed, high velocity spray moving through and substantially filling the upper end of a vertically disposed Venturi tube whose other end is open to free air, whereby the spray entrains by aspirating action a substantial volume of air in emerging from said tube, directing said spray and entrained air against a horizontally disposed baffle thereby to effect introduction of oxygen into the liquid and a partial oxidation and release of oxidizable matter contained in the liquid, then collecting the liquid particles falling from said baffle, and retaining the so collected liquid for a predetermined retention period required to effect a desired further oxidation of oxidizable matter contained in the liquid.

SVEND A. CANARIIS.

REFERENCES CITED

The following references are of record in the file of this patent:

UNITED STATES PATENTS

| Number | Name | Date |
|---|---|---|
| 743,528 | Le Reau | Nov. 10, 1903 |
| 938,075 | Reisert | Oct. 26, 1909 |
| 968,332 | Dow | Aug. 23, 1910 |
| 1,100,307 | Jackson | June 16, 1914 |
| 1,312,898 | Ehrhart | Aug. 12, 1919 |
| 1,808,854 | Malone | June 9, 1931 |
| 1,964,357 | Kitterer | June 26, 1934 |
| 2,088,691 | Dill | Aug. 3, 1937 |
| 2,115,188 | Atkinson et al. | Apr. 26, 1938 |
| 2,495,937 | Lawlor | Jan. 31, 1950 |

FOREIGN PATENTS

| Number | Country | Date |
|---|---|---|
| 19,596 | Great Britain | 1913 |